US007470498B2

(12) United States Patent
Iinuma et al.

(10) Patent No.: US 7,470,498 B2
(45) Date of Patent: Dec. 30, 2008

(54) MG-BASED FERRITE, AN ELECTROPHOTOGRAPHIC DEVELOPMENT CARRIER CONTAINING THE FERRITE, AND A DEVELOPER CONTAINING THE CARRIER

(75) Inventors: Hidehiko Iinuma, Shibukawa (JP); Kenkichi Hara, Shibukawa (JP); Masatomo Hayashi, Shibukawa (JP)

(73) Assignee: Kanto Denka Kogyo Co., Ltd., Tokyo (JP)

( * ) Notice: Subject to any disclaimer, the term of this patent is extended or adjusted under 35 U.S.C. 154(b) by 430 days.

(21) Appl. No.: 10/551,691

(22) PCT Filed: Mar. 26, 2004

(86) PCT No.: PCT/JP2004/004358

§ 371 (c)(1), (2), (4) Date: Sep. 30, 2005

(87) PCT Pub. No.: WO2004/088680

PCT Pub. Date: Oct. 14, 2004

(65) Prior Publication Data

US 2006/0199093 A1 Sep. 7, 2006

(30) Foreign Application Priority Data

Mar. 31, 2003 (JP) ............................. 2003-096744
Nov. 4, 2003 (JP) ............................. 2003-384456

(51) Int. Cl.
*G03G 9/107* (2006.01)
*H01F 1/00* (2006.01)
*C04B 35/26* (2006.01)

(52) U.S. Cl. ............................. 430/111.33; 252/62.63; 252/62.64

(58) Field of Classification Search ............ 430/111.31, 430/111.33; 252/62.64, 62.63
See application file for complete search history.

(56) References Cited

U.S. PATENT DOCUMENTS

| | | | | |
|---|---|---|---|---|
| 4,282,302 | A | 8/1981 | Makino et al. | |
| 5,439,771 | A | 8/1995 | Baba et al. | |
| 5,494,770 | A | 2/1996 | Baba et al. | |
| 5,538,656 | A | 7/1996 | Mano et al. | |
| 5,595,850 | A | 1/1997 | Honjo et al. | |
| 5,795,693 | A | 8/1998 | Okado et al. | |
| 6,090,517 | A | 7/2000 | Tamura et al. | |
| 2003/0044711 | A1 | 3/2003 | Hutcheson | |
| 2007/0087282 | A1 * | 4/2007 | Iinuma et al. | 430/111.31 |

FOREIGN PATENT DOCUMENTS

| | | | |
|---|---|---|---|
| CN | 1141445 | A | 1/1997 |
| CN | 1117294 | C | 8/2003 |
| EP | 0 242 712 | A2 | 10/1987 |
| EP | 0 744 668 | A2 | 11/1996 |
| JP | 61-25157 | A | 2/1986 |
| JP | 62-37782 | B | 8/1987 |
| JP | 63-184764 | A | 7/1988 |
| JP | 3243376 | | 7/1994 |
| JP | 2860356 | | 2/1995 |

* cited by examiner

*Primary Examiner*—John L Goodrow
(74) *Attorney, Agent, or Firm*—Browdy and Neimark, P.L.L.C.

(57) ABSTRACT

This invention provides an Mg-based ferrite carrier composed of an environment-friendly material meeting environmental regulations, and an electrophotographic developer comprising the carrier. The carrier and the developer of this invention realize high image quality and improved gradation properties. This invention also provides a method for producing the Mg-based ferrite material having a saturation magnetization of from 30 to 80 emu/g and a dielectric breakdown voltage of from 1.0 to 5.0 kV, and having the composition of the formula (1). The above properties are obtained by controlling conditions of sintering and heating treatments. CaaMgbFecOd (1) wherein a, b, and c satisfy 0.10 b/(b+c/2) 0.85 and 0 R(Ca) 0.10; R(Ca) is expressed as R(Ca)=a~Fw (CaO)/(a~Fw(CaO)+b~Fw(MgO)+(c/2)~Fw(Fc2O3)) (Fw(A): formula weight of A j; and d is determined by oxidation numbers of Ca, Mg and Fe.

21 Claims, 2 Drawing Sheets

MG-BASED FERRITE, AN ELECTROPHOTOGRAPHIC DEVELOPMENT CARRIER CONTAINING THE FERRITE, AND A DEVELOPER CONTAINING THE CARRIER

TECHNICAL FIELD

This invention relates to a Mg-based ferrite magnetic material. This material can be used for a carrier of a two-component developer in an electrophotographic development device, including a copying machine and a printer. This invention also relates to an electrophotographic developer that contains said material as a carrier.

BACKGROUND ART

Electrophotography is a method comprising forming an electrostatic latent image on a photoreceptor; depositing a toner onto the image to form an imagewise pattern; and transferring the toner to an object. Electrophotography includes two major categories: two-component development and one-component development. In the two-component development, a developer contains two components of a carrier and a toner, and a magnetic carrier is often used as a carrier.

In the two-component development with a magnetic carrier, a developer is stirred and mixed in a developing vessel such that a toner is electrostatically charged to a desired extent by friction between the carrier and the toner. The mixed developer is then fed to a magnet roll (hereinafter, referred to a roll), and spikes of the developer are formed along magnetic lines. The spikes are called magnetic brushes. The magnetic brushes are allowed to come into contact with a surface of a photoreceptor, and thereby the charged toner is deposited onto the surface in conformity with the electrostatic latent image to form a desired image.

While the toner is transferred onto the photoreceptor, the magnetic carrier remains on the roll, and is recovered and reused. Hence, the carrier preferably has a high longevity.

Electrophotography is utilized in a wide range of fields including a copying machine, a printer and a facsimile. In these fields, there is a need to improve image quality, resolution, gradation properties, and reproducibility of fine lines. Deterioration of image quality is partially due to a leak of the potential of the electrostatic latent image via the carrier. With the lower electric resistance of the carrier, the leak phenomenon is more likely to occur. However, even for a carrier initially having a high electric resistance, the electric resistance may be reduced by dielectric breakdown when a high voltage is applied. In such a case, the carrier may contribute to a leak.

Recently, a high bias potential is often applied between a photoreceptor and a roll to achieve high image quality. At such a high bias potential, a conventional carrier tends to cause dielectric breakdown. Hence, there is a need for an electrophotographic development carrier having a high dielectric breakdown voltage and a high longevity.

In order to improve image quality, it is necessary to adjust the saturation magnetization of a magnetic carrier into a certain range, as well as to enhance dielectric breakdown voltage. When the saturation magnetization is too small, the Image quality is deteriorated because carriers are scattered and undesirably deposited on an object. When the saturation magnetization is too large, the spike becomes too hard to maintain image quality.

As a conventional ferrite carrier having a high dielectric breakdown voltage, a Cu—Zn-based ferrite (for example, see Japanese Patent No. 1,688,677) and a Mn—Mg-based ferrite (for example, see Japanese Patent No. 3,243,376) have been used. Under recent environmental regulations, however, it Is desired to reduce the amount of heavy metals used such as Cu, Zn, Mn, Co and Ni. For example, under Title 22 of the State Law of California, Ni, Cu, Zn and the like are control subjects. Moreover, under the PRTR system, Mn compounds are designated as compounds that may be harmful to the health of human beings and an ecosystem.

Magnetite ($Fe_3O_4$) has been conventionally known as a magnetic carrier in compliance with environmental regulations; however, magnetite has a problem of a low dielectric breakdown voltage. Moreover, magnetite has a low electric resistance. Due to this low electric resistance, when alternating voltage is applied, a leak phenomenon occurs upon development even if insulating properties are improved by coating with various resins. In order to achieve a high electric resistance for magnetite, there has been an attempt to heat a material in air to form a high electric resistance and non-magnetic phase ($Fe_2O_3$ phase), which co-exists with magnetite. With the increased percentage of the $Fe_2O_3$ phase in the carrier, the dielectric breakdown voltage becomes higher. However, coercive force is disadvantageously increased. The increased coercive force causes agglomeration of carrier particles, resulting in lowered flowability. The lowered flowability raises a new problem that it is difficult to obtain image quality comparable to that for the ferrite carrier. In addition, since magnetite has a relatively high saturation magnetization, the spike of the magnetic brush becomes too hard.

As an oxide carrier capable of being controlled to have a desired saturation magnetization and meeting environmental regulations, Mg—Fe—O based powder and a method of producing the powder are reported (see Japanese Patent No. 2,860,356). According to this method, a binder is added as a reducing agent, and then sintered in an inert gas atmosphere. Therefore, the valence of Fe can be kept low. As a result, various phases such as magnetite phase and MgO phase co-exist in the resulting powder. Hence, there still remains a problem of a low dielectric breakdown voltage derived from magnetite.

A Mg-based ferrite in the form of a single phase of Mg and Fe is obtained by sintering a stoichiometric composition in air. While this Mg-based ferrite has a high dielectric breakdown voltage, it has a low saturation magnetization from 20 to 25 emu/g.

Accordingly, there still remains a need to realize both a proper saturation magnetization and a high dielectric breakdown voltage simultaneously.

DISCLOSURE OF THE INVENTION

The object of the present invention is to provide a magnetic carrier meeting environmental regulations and achieving a high image quality, in order to overcome the above problems. More specifically, this invention relates to a carrier comprising an Mg-based ferrite material, a process for producing the Mg-based ferrite material, an electrophotographic developer comprising the carrier.

As a result of extensive research, the inventors have found that an Mg-based ferrite material and a Ca-containing Mg-based ferrite material (hereinafter, “an Mg-based ferrite” encompasses a Ca-containing Mg-based ferrite) have performances required for an electrophotographic development carrier (for example, saturation magnetization and dielectric breakdown voltage). Moreover, the inventors have found that the desired properties of the ferrite material can be realized by the process of the present invention comprising at least two heating steps. In particular, the former heating step may be performed in an inert gas atmosphere, and the latter heating step may be performed in an oxygen-containing atmosphere. These findings led to the completion of this invention.

The problems above are solved by an Mg-based ferrite material, which has the composition of the formula (1):

$$Ca_aMg_bFe_cO_d \quad (1),$$

wherein a, b, and c satisfy $$0.10 \leqq b/(b+c/2) \leqq 0.85 \text{ and } 0 \leqq R(Ca) \leqq 0.10,$$

wherein R(Ca) is expressed as $$R(Ca)=a\times Fw(CaO)/(a\times Fw(CaO)+b\times Fw(MgO)+(c/2)\times Fw(Fe_2O_3))$$

(Fw(A): formula weight of A); and d is determined by oxidation numbers of Ca, Mg and Fe;

wherein said Mg-based ferrite material has a saturation magnetization in the range of 30-80 emu/g; wherein said Mg-based ferrite material has a dielectric breakdown voltage in the range of 1.0-5.0 kV. b and c may satisfy the formula $0.30 \leqq b/(b+c/2) \leqq 0.70$. The average particle diameter may be in the range from 0.01 to 150 μm.

The above problems can also be solved with an electrophotographic development carrier comprising said Mg-based ferrite material. The Mg-based ferrite material may be coated with resin. Moreover, the above problems can also be solved with an electrophotographic developer comprising said carrier and a toner. The weight ratio of the toner to the carrier may be in the range from 2 to 40 weight %.

The Mg-based ferrite material can be produced by a process comprising step i) of mixing raw materials; step ii) of sintering the mixed raw materials to grow particles wherein a maximum temperature is in the range of 800-1500° C.; and step iii) of heating the sintered raw materials under an oxygen-containing atmosphere to condition properties of the particles, wherein a maximum temperature is in the range of 300-1000° C.

An oxygen concentration of the atmosphere in step iii) can be higher than that in step ii). The step iii) can be performed in an inert gas atmosphere having an oxygen concentration of from 0.05 to 25.0 volume %, and the step ii) can be performed in an inert gas atmosphere having an oxygen concentration of from 0.001 to 10.0 volume %. As used herein, an inert gas atmosphere may contain a gas other than inert gases, such as oxygen. A concentration of each gas component is expressed on the basis of the total amount of the gases contained in the atmosphere.

Moreover, the step i) of mixing raw materials can be performed by preparing a slurry containing a Mg-containing compound and a Fe-containing compound; and drying the slurry for granulation. The slurry may further comprise a Ca-containing compound and/or a binder, and the amount of the binder may be in the range from 0.1 to 5 weight % on the basis of the total amount of raw materials contained in the slurry.

These and other objects, features, and advantages of the present invention will become more apparent upon reading of the following detailed description along with the accompanied drawings.

DETAILED DESCRIPTION

Figure 1:
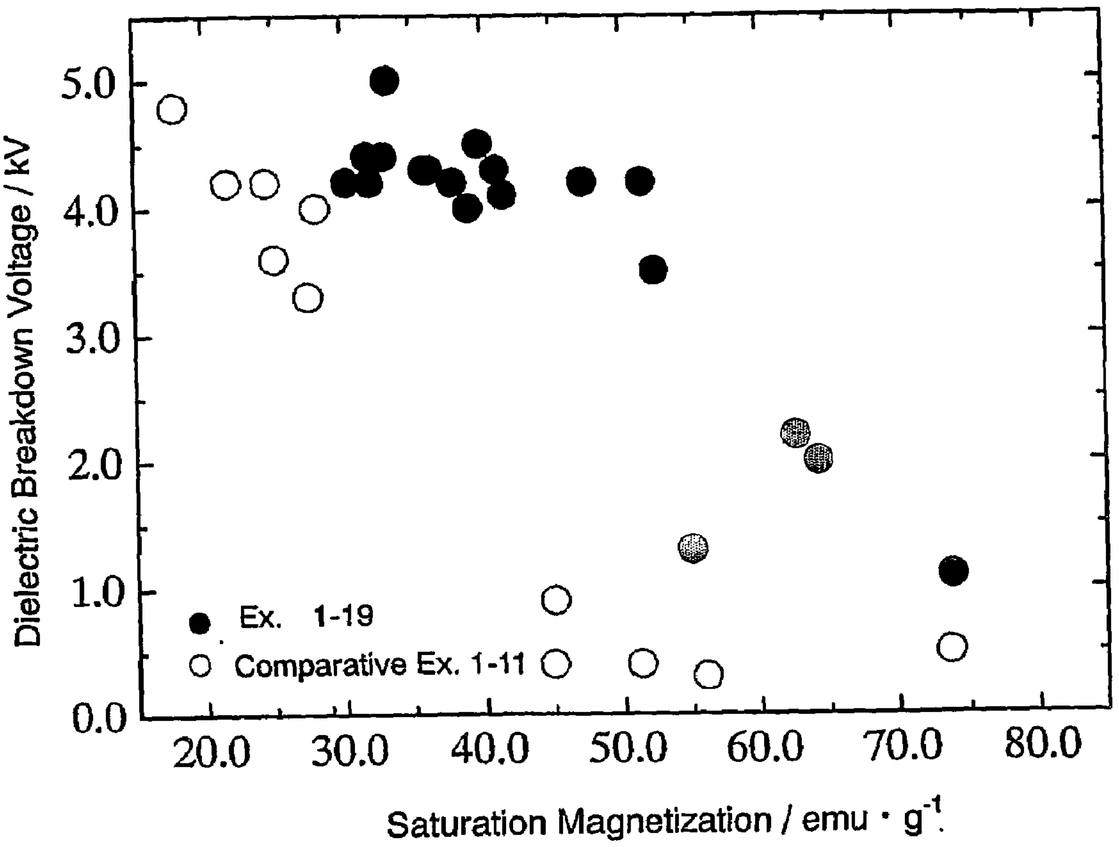
FIG. 1 shows the relationship between the saturation magnetization and the dielectric breakdown voltage of the Mg-based ferrite carrier of the present invention.

The Mg-based ferrite material of the present invention can be used as a magnetic material in various applications, for example, a magnetic fluid, a magnetic recording medium, a wave absorber and a magnetic core material, in particular, for electrophotographic development.

The Mg-based ferrite material of the present invention has a saturation magnetization of no less than 25 emu/g, preferably no less than 30 emu/g, more preferably no less than 40 emu/g, of no greater than 100 emu/g, preferably no greater than 90 emu/g, more preferably no greater than 80 emu/g. When the saturation magnetization is below the range above, undesirable adhesion of carriers causes deterioration of image quality. When the saturation magnetization is beyond the range above, the spikes become hard, resulting in deterioration of image quality.

As used herein, the saturation magnetization is measured at 14 kOe using an vibrating sample magnetometer, and a method of measurement is as described in Examples.

The Mg-based ferrite material of the present invention has a dielectric breakdown voltage of no less than 1.0 kV, preferably no less than 2.5 kV. When the dielectric breakdown voltage is below the range above, a leak of electrostatic latent image potential on a photoreceptor occurs upon development, and the longevity of the carrier may decrease. With the higher dielectric breakdown voltage, high image quality can be kept for a longer period. Therefore, the upper limit of the dielectric breakdown voltage is not restricted. With a view to satisfying other properties, the dielectric breakdown voltage may be of no greater than 10.0 kV, preferably no greater than 7.5 kV, more preferably no greater than 5.0 kV.

As used herein, the value of the dielectric breakdown voltage is a value obtained at the time when a leak electric current exceeds 110 mA under an alternating voltage applied, and a method of measurement is as described in Examples.

The average particle diameter of the Mg-based ferrite material is of no less than 0.01 μm, preferably no less than 2 μm, more preferably no less than 5 μm, even more preferably no less than 10 μm, of no greater than 200 μm, preferably no greater than 150 μm. When the particle diameter is below the range above, the material tends to deposit onto a photoreceptor excessively, and when the particle diameter is beyond the range above, an image becomes rough, and an image quality is deteriorated.

The Mg-based ferrite material of the present invention has the composition of the formula (1):

$$Ca_aMg_bFe_cO_d \quad (1),$$

wherein a, b, and c satisfy $$0.10 \leqq b/(b+c/2) \leqq 0.85 \text{ and } 0 \leqq R(Ca) \leqq 0.10,$$

wherein R(Ca) is expressed as $$R(Ca)=a\times Fw(CaO)/(a\times Fw(CaO)+b\times Fw(MgO)+(c/2)\times Fw(Fe_2O_3))$$

(Fw(A): formula weight of A); and d is determined by oxidation numbers of Ca, Mg and Fe;

wherein said Mg-based ferrite material has a saturation magnetization in the range of 30-80 emu/g; wherein said Mg-based ferrite material has a dielectric breakdown voltage in the range of 1.0-5.0 kV. b and c may satisfy the formula $0.30 \leqq b/(b+c/2) \leqq 0.70$.

When Ca is added, saturation magnetization can be advantageously improved with maintaining a high dielectric breakdown voltage. As a result, a high image quality and excellent gradation properties can be obtained. Without being bound to any theory, these advantages can be attributed to an effect of Mg-site substitution on structural stability and conductivity; a change in a magnetic structure via superexchange interaction; modification on a grain boundary without solid solution; and a change in a magnetic domain.

The Mg-based ferrite material may further comprise one or more elements selected from the group consisting of Li, Na, K, Rb, Ba, Sr, B, Al, Si, V, Ti, Zr, Cu, Ni, Co, Zn, Mn, La and Y. These elements may substitute the sites of Ca, Mg and Fe, or form another phase. However, in view of environmental regulations, it is preferable that the sum of heavy metals contained does not exceed the sum of Mg and Ca by mole.

As used herein, a ferrite material is referred to a material comprising normal spinel phase and/or inverse spinel phase ferrite. The ferrite material may comprise other Fe-containing phase, for example, a garnet phase and a magnetoplumbite phase, or may comprise a Fe-free phase, for example, MgO and $Ca_2Fe_2O_5$. The composition of the ferrite material is not that of a specific phase in the ferrite material but the average composition of the ferrite material.

The values of a, b and c are not particularly restricted as long as desired properties can be obtained. For example, b/(b+c/2) can be in the range of 0.10-0.85. When b/(b+c/2) is too small, the dielectric breakdown voltage tends to decrease due to the formation of excessive $Fe_2O_3$. When b/(b+c/2) is too large, a non-magnetic phase such as MgO phase is formed excessively, and thereby the saturation magnetization tends to decrease. When Ca is added, the saturation magnetization can be increased with maintaining a high dielectric breakdown voltage. Hence, even for a Mg-rich composition (namely, a composition having a large b/(b+c/2)) wherein a sufficient saturation magnetization cannot be obtained in the absence of Ca, a proper saturation magnetization and a high dielectric breakdown voltage can be simultaneously obtained by the addition of Ca. In the absence of Ca, it is preferable to adjust b/(b+c/2) into the range of from 0.30 to 0.70.

In the case of adding Ca, the lower limit of the Ca amount is not particularly restricted. When R(Ca) is of no less than 0.001, its effect can be easily detected. When Ca is added excessively, an impurity phase (for example, $Ca_2Fe_2O_5$) is formed, resulting in a decreased saturation magnetization. Thus, R(Ca) is preferably of no greater than 0.10, more preferably no greater than 0.08.

Hereafter, the process for producing the Mg-based ferrite carrier of the present invention will be described. The Mg-based ferrite material of the present invention can be produced by the process comprising step i) of mixing raw materials; step ii) of sintering the mixed raw materials to grow particles wherein a maximum temperature is in the range of 800-1500° C.; and step iii) of heating the sintered raw materials under an oxygen-containing atmosphere to condition properties of the particles, wherein a maximum temperature in the range of 300-1000° C.

As raw materials to be used in the mixing step i), various compounds such as oxides, carbonates, hydroxides, oxyhydroxides, oxalates, nitrates, acetates, lactates and chlorides can be used. For example, MgO, $MgCO_3$, $Mg(OH)_2$ and $MgCl_2$ can be used as Mg raw materials; FeO, $Fe_2O_3$, $Fe_3O_4$ and $Fe(OH)_x$ can be used as Fe raw materials (x representing a number in the range from 2 to 3); CaO, $CaCO_3$, $Ca(OH)_2$ and $CaCl_2$ can be used as Ca raw materials. In view of treatment of generated gases during sintering, it is preferable to use oxides, carbonates, hydroxides, oxalates, oxyhydroxides, and mixtures thereof. For each element, one compound may be used as a raw material. Alternatively, a mixture of compounds may be used. Otherwise, a part of raw materials may be mixed at a predetermined ratio in advance according to a conventional methods including co-precipitation method, then be provided for the step ii).

The raw materials above are weighed and mixed at a predetermined composition. Examples of a method to mix the raw materials include, without limitation, various wet mixing methods such as wet mixing with water, and various dry mixing methods. For example, the above raw materials may be ground and mixed in a wet ball mill, an attritor or a Dyno-Mill to form a slurry. A predetermined amount of a binder may be added to the slurry. As the binder, various polymers, for example, polyvinyl alcohol, CMC and an acrylic thickener can be used. In the case where polyvinyl alcohol is used, the amount thereof is preferably from 0.1 to 5 weight % on the basis of the total amount of the raw materials contained in the slurry. If necessary, a desired amount of a dispersant, an antifoaming agent and the like can be added. A sintering aid (for example, oxides or chlorides of B, Al, Si, Sr, V, Y, Bi, La, Ti and Zr) may be added to the slurry, or may be mixed in a solid phase before sintering, or may be fed to a gas phase during a sintering or heating treatment. The sintering aid may remain after a heat treatment, which will be described later.

The slurry obtained is dried for granulation by a spray dryer to prepare spherical pellets. The spherical pellets are controlled into a desired shape as a ferrite material. For example, the spherical pellets can have an average particle diameter from 0.01 to 200 μm.

All the raw materials may be slurried in one procedure. Alternatively, a part of the raw materials, for example, an Mg-containing compound and a Fe-containing compound, may be slurried and dried for granulation, and the remaining raw materials may be then mixed with the granulated particles in a solid phase.

The process for production of the present invention comprises step i) of mixing raw materials, and at least two heating steps: step ii) of sintering the mixed raw materials in an inert gas atmosphere to grow particles, and step iii) of heating the sintered raw materials in an oxygen-containing atmosphere to control and condition properties such as a crystal structure, a magnetic structure, an oxidation number of each metal, and an occupation rate of each site. It is possible to obtain the properties desired for a magnetic carrier, including a dielectric breakdown voltage and a saturation magnetization, by adjusting the conditions of the sintering and heating steps, for example, an oxygen concentration, a sintering temperature, a period for sintering, a heating treatment temperature, and a period for heating treatment. For example, desired carrier properties can be obtained by performing the step iii) in a higher oxygen concentration of the atmosphere than that of the step ii), and setting the maximum temperature of the step ii) to be higher than that of the step iii). Calcination may be performed before the step ii).

The step ii) and the step iii) may be performed separately, or may be performed continuously. The step ii) may be performed prior to or after the step iii). However, it is preferable to perform the step ii) prior to the step iii).

The step ii) can be performed in an inert gas atmosphere having an oxygen concentration of no greater than 10 volume %, preferably no greater than 3 volume A, more preferably no greater than 1 volume %. Examples of an inert gas include nitrogen, rare gases such as argon, and a mixture thereof. A reducing gas may further be added into the inert gas atmosphere. The lower limit of oxygen concentration in the inert gas atmosphere is not particularly restricted, and the inert gas atmosphere may contain substantially no oxygen. As used herein, a state of containing substantially no oxygen is referred to a state with an oxygen concentration of less than 0.001 volume %. An atmosphere with an oxygen concentration of no less than 0.001 volume % is advantageous, because it can be provided inexpensively.

The step iii) is performed in an oxygen-containing atmosphere. The oxygen concentration is preferably of no less than 0.05 volume %, preferably of no greater than 70 volume %, more preferably no greater than 50 volume %, even more preferably no greater than 25 volume %. When the oxygen concentration exceeds the above range, safety in the operation may be lost. It is preferable that gas-phase components other than oxygen are inert gases.

The maximum temperature of the step ii) can be selected such that particles grow to a desired extent. A desired temperature depends upon the degree of grinding and mixing of raw materials. With a view to obtain an average particle diameter of from 0.01 to 150 μm, the temperature is preferably set in the range from 800 to 1,500° C.

The temperature of the step iii) is selected so as to obtain desired physical properties. For example, the temperature may be set in the range from 200 to 1,500° C., preferably from 300 to 1,000° C. With the increased amount of a binder in the step ii), the binder may serve as a reducing agent more clearly. Thus, it is necessary to properly set the amount of the binder added according to the kind thereof.

The Mg-based ferrite obtained is ground by a grinder, and the ground powder is classified to have a desired average particle diameter and a desired distribution of a particle diameter as a ferrite material for various applications. For classification, various known means such as sieving can be used. Recently, it has been required that the average particle diameter should be from 0.01 to 150 μm for use as an electrophotographic carrier as well as a magnetic material. The conditions of granulation and/or classification can be adjusted such that the average particle diameter should be within this range.

The obtained Mg-based ferrite material of the present invention can be subjected to a surface treatment, if necessary. For example, the Mg-based ferrite material can be used as a core material, and the surface thereof can be coated with resin. The coating resin is not particularly restricted as long as the coated ferrite material satisfies desired physical properties. Examples of the coating resin include various kinds of silicone-based resin such as silicone resin and derivatives thereof, fluorine-based resin, styrene-based resin, acrylic resin, methacrylic resin, polyester-based resin, polyamide-based resin, epoxy-based resin, polyether-based resin, phenol-based resin and melamine-based resin. These resins can be used alone or in combination, and copolymers thereof can also be used. With regard to use in combination, for example, two or more types of resin may be mixed prior to use, or separately coated in turn to form a multilayer. If necessary, other component or components such as a charge control agent, an electric resistance control agent and an adhesion improver may be added to the resin, and the use thereof is not particularly restricted unless the effect of the present invention is impaired.

Any methods in the prior art can be used for coating the ferrite material with the above resins, and be selected according to a specific application. For example, a spray method with a fluidized bed and a dipping method can be used. The above resins are typically diluted with or dispersed in an organic solvent such as methyl ethyl ketone, methyl isobutyl ketone, tetrahydrofuran, toluene, xylene, chloroform and alcohol or a mixed solvent thereof to prepare a resin solution or an emulsion for use. The ferrite core material of the present invention is then dipped in the resin solution or the emulsion. Alternatively, the above resin solution is sprayed onto the ferrite core material, which is fluidized in advance to form a resin layer. A uniform film can be obtained by spraying the resin solution onto the ferrite core material in a fluidized state.

The amount of the coating resin is preferably from 0.05 to 10.0 weight % of the ferrite material. When the amount of the resin is less than 0.05 weight %, the surfaces of ferrite particles may not be coated sufficiently. When the amount is lager than 10.0 weight %, aggregation may occur among ferrite particles.

In order to remove the solvent and cure the resin after the formation of a coating, various heating methods can be used. The heating temperature is set according to the solvent and the resin used. It is preferable to set the temperature beyond the melting point or the glass transition point of the resin. After the heat-treated particles are allowed to be cooled, grinding and classification are performed again, if desired.

The coating step can be performed between the step ii) and the step iii). In such a case, the curing treatment of the resin and the heating step iii) can be performed simultaneously.

The Mg-based ferrite carrier of the present invention is mixed with a toner at a predetermined ratio for use as a two-component developer. For the two-component developer, the toner concentration is preferably from 2 to 40 weight % based on the amount of the carrier. Various known toners such as a ground toner and a polymerized toner can be used, and various method of producing them can be used.

A toner is prepared by dispersing a colorant and an antistatic agent into a binding resin. Examples of the binding resin include, without limitation, polystyrene-based resin, styrene-acrylic-based resin, styrene-chlorostyrene-based resin, polyester-based resin, epoxy-based resin and polyurethane-based resin. For the colorant and the charge control agent, any agents in the prior art can be used, if desired.

Moreover, the Mg-based ferrite of the present invention can be used as a material in a toner. For example, it can be used as a magnetic material of a magnetic toner.

EXAMPLES

Hereafter, the present invention will be described according to Examples. However, the present invention is by no means restricted by these examples.

Examples 1-16

[Production of an Mg-Based Ferrite Material]

MgO, $Fe_2O_3$ and CaO were used as raw materials to produce an Mg-based ferrite material. First, these raw materials were weighed at a predetermined composition as shown in Table 1. The weighed raw materials were added to water together with a binder (polyvinyl alcohol), a dispersant and an antifoaming agent; and ground and mixed in a wet ball mill for four hours to prepare slurry. The concentration of the slurry was 50 weight %. The amount of the antifoaming agent was 0.1 weight %, and the amount of the dispersant was 0.15 weight %, on the basis of the total amount of the raw materials in the slurry.

The obtained slurry was dried for granulation by a spray dryer to prepare spherical pellets. These spherical pellets were sintered at 1,200° C. in an electric furnace in a nitrogen atmosphere. The oxygen concentration in the nitrogen atmosphere was below 1,000 ppm. This sintered material was heated at 500° C. in a nitrogen atmosphere with an oxygen concentration of 20 volume %. Thereafter, the material was ground and classified to obtain an Mg-based ferrite material with an average particle diameter of 50 μm. The contents of particles with a diameter of no less than 75 μm, from 45 to 63 μm, and of no greater than 40 μm are 15 weight %, 50 weight %, and 35 weight %, respectively, on the basis of the total amount of the particles.

In Table 1, the amounts of Mg and Fe are expressed at a molar ratio of MgO: $Fe_2O_3$. The amount of Ca is expressed by weight % of CaO based on the sum of the weights of (MgO+$Fe_2O_3$+CaO). The amounts of Mg, Fe, and Ca in Tables 2 and 3 are expressed in the same manner as in Table 1.

The saturation magnetization, the dielectric breakdown voltage and the electric resistance of the obtained Mg-based ferrite material are shown in Table 1. The relationship between the saturation magnetization and the dielectric breakdown voltage is shown in FIG. 1.

TABLE 1

| Sample | Composition MgO:$Fe_2O_3$ (molar ratio) | Composition CaO (wt. %) | Temperature and atmosphere of step i) | Temperature and atmosphere of step ii) | Saturation magnetization/emu/g | Dielectric breakdown voltage/kV | Electric resistance/Ω | Image Evaluation |
|---|---|---|---|---|---|---|---|---|
| Example 1 | 70:30 | — | 1200° C., $N_2$ | 500° C., 20 vol. % $O_2$ | 30.3 | 4.2 | $7.2 \times 10^8$ | good |
| Example 2 | 60:40 | — | " | 500° C., 20 vol. % $O_2$ | 32.0 | 4.2 | $8.5 \times 10^8$ | " |
| Example 3 | 50:50 | — | " | 500° C., 20 vol. % $O_2$ | 31.8 | 4.4 | $3.5 \times 10^9$ | " |
| Example 4 | 40:60 | — | " | 500° C., 20 vol. % $O_2$ | 35.9 | 4.3 | $3.3 \times 10^9$ | " |
| Example 5 | 35:65 | — | " | 500° C., 20 vol. % $O_2$ | 39.8 | 4.5 | $1.2 \times 10^9$ | " |
| Example 6 | 30:70 | — | " | 500° C., 20 vol. % $O_2$ | 36.2 | 4.3 | $8.5 \times 10^9$ | " |
| Example 7 | 50:50 | 2 | " | 500° C., 20 vol. % $O_2$ | 41.0 | 4.3 | $3.5 \times 10^9$ | " |
| Example 8 | 50:50 | 4 | " | 500° C., 20 vol. % $O_2$ | 37.9 | 4.2 | $2.6 \times 10^9$ | " |
| Example 9 | 50:50 | 8 | " | 500° C., 20 vol. % $O_2$ | 33.0 | 4.4 | $4.3 \times 10^9$ | " |
| Example 10 | 35:65 | 2 | " | 500° C., 20 vol. % $O_2$ | 47.3 | 4.2 | $1.8 \times 10^9$ | " |
| Example 11 | 35:65 | 4 | " | 500° C., 20 vol. % $O_2$ | 51.5 | 4.2 | $1.1 \times 10^9$ | " |
| Example 12 | 35:65 | 8 | " | 500° C., 20 vol. % $O_2$ | 41.5 | 4.1 | $1.5 \times 10^9$ | " |
| Example 13 | 20:80 | 2 | " | 500° C., 20 vol. % $O_2$ | 64.2 | 2.0 | $1.1 \times 10^{10}$ | " |
| Example 14 | 20:80 | 4 | " | 500° C., 20 vol. % $O_2$ | 62.6 | 2.2 | $2.5 \times 10^9$ | " |
| Example 15 | 20:80 | 8 | " | 500° C., 20 vol. % $O_2$ | 39.0 | 4.0 | $5.2 \times 10^8$ | " |
| Example 16 | 10:90 | 1 | " | 500° C., 20 vol. % $O_2$ | 73.8 | 1.1 | $2.2 \times 10^9$ | " |

TABLE 2

| Sample | Composition MgO:$Fe_2O_3$ (molar ratio) | Composition CaO (wt. %) | Temperature and atmosphere of step i) | Temperature and atmosphere of step ii) | Saturation magnetization/emu/g | Dielectric breakdown voltage/kV | Electric resistance/Ω | Image evaluation | Remarks |
|---|---|---|---|---|---|---|---|---|---|
| Comparative example 1 | 75:25 | — | 1200° C., $N_2$ | 500° C., 20 vol. % $O_2$ | 24.5 | 4.2 | $7.0 \times 10^8$ | carrier adhesion | deviated composition |
| Comparative example 2 | 25:75 | — | " | 500° C., 20 vol. % $O_2$ | 45.0 | 0.9 | $3.8 \times 10^{10}$ | development leak | deviated composition |
| Comparative example 3 | 50:50 | 15 | " | 500° C., 20 vol. % $O_2$ | 25.1 | 3.6 | $1.0 \times 10^{10}$ | carrier adhesion | deviated composition |
| Comparative example 4 | 35:65 | 15 | " | 500° C., 20 vol. % $O_2$ | 27.5 | 3.3 | $3.4 \times 10^{10}$ | carrier adhesion | deviated composition |
| Comparative example 5 | 20:80 | 15 | " | 500° C., 20 vol. % $O_2$ | 28.1 | 4.0 | $4.5 \times 10^8$ | carrier adhesion | deviated composition |
| Comparative example 6 | 5:95 | 1 | " | 500° C., 20 vol. % $O_2$ | 73.6 | 0.5 | $1.1 \times 10^9$ | development leak | deviated composition |
| Comparative example 7 | 50:50 | — | " | — | 44.9 | 0.4 | $5.8 \times 10^6$ | development leak | omission of step ii) |
| Comparative example 8 | 35:65 | — | " | — | 51.2 | 0.4 | $2.8 \times 10^7$ | development leak | omission of step ii) |
| Comparative example 9 | 35:65 | 4 | " | — | 56.0 | 0.3 | $1.2 \times 10^7$ | development leak | omission of step ii) |

TABLE 2-continued

| Sample | Composition MgO:$Fe_2O_3$ (molar ratio) | CaO (wt. %) | Temperature and atmosphere of step i) | Temperature and atmosphere of step ii) | Saturation magnetization/ emu/g | Dielectric breakdown voltage/kV | Electric resistance/Ω | Image evaluation | Remarks |
|---|---|---|---|---|---|---|---|---|---|
| Comparative example 10 | 50:50 | — | 1200° C., Air | — | 21.7 | 4.2 | $2.8 \times 10^{10}$ | carrier adhesion | omission of step ii) sintered under air in step i) |
| Comparative example 11 | 35:65 | — | " | — | 17.9 | 4.8 | $4.5 \times 10^{7}$ | carrier adhesion | omission of step ii) sintered under air in step i) |

As shown in Examples 3 and 7 to 9 as well as Examples 5 and 10 to 12, when a certain amount of Ca is added, the saturation magnetization can be improved while maintaining a high dielectric breakdown voltage.

The conditions for measuring a saturation magnetization, dielectric breakdown voltage and electric resistance are as follows.

<Measurement of Saturation Magnetization>

Saturation magnetization was measured by a vibrating sample magnetometer (VSMP-1S, manufactured by Toei Kogyo). A sample was placed in a measuring capsule (0.0565 cc), and a magnetic field of 14 kOe was applied.

<Measurement of Dielectric Breakdown Voltage>

Figure 2:
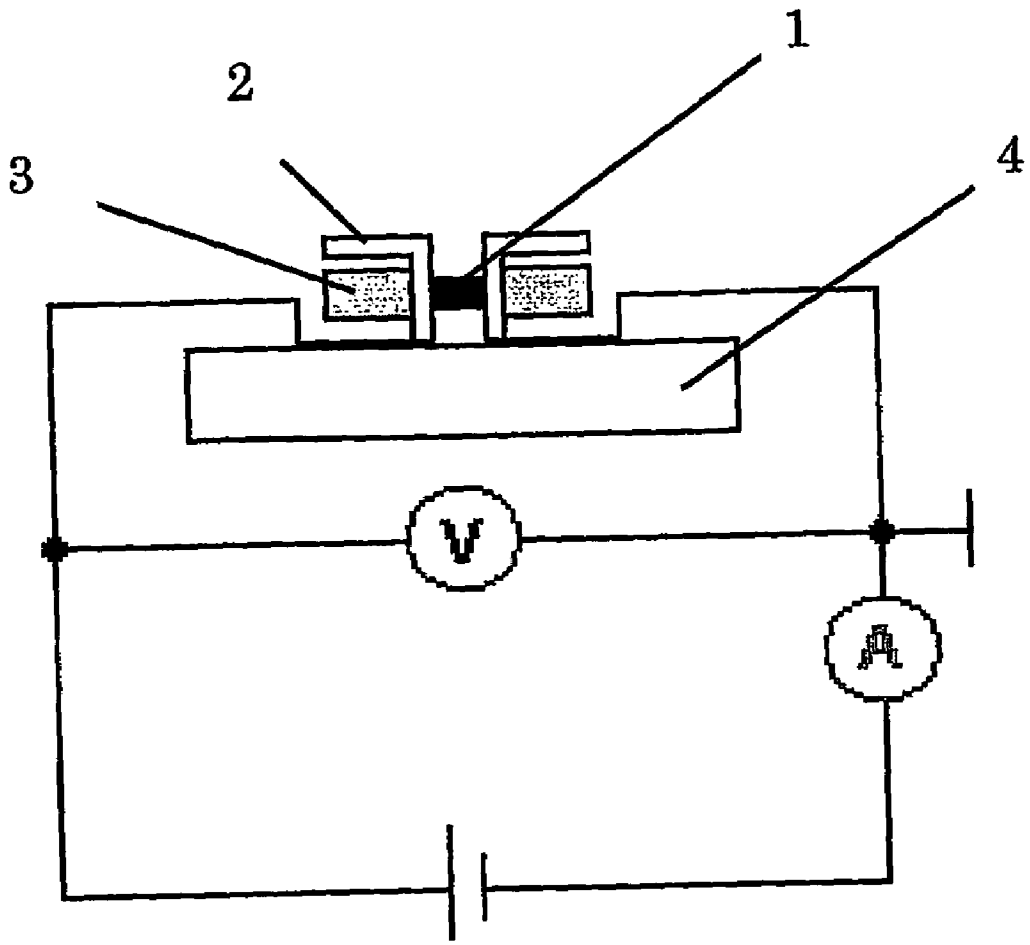
FIG. 2 is a circuit diagram for a measuring device of dielectric breakdown voltage. 1: sample, 2: brass, 3: magnetic pole, 4: Teflon support.

Dielectric breakdown voltage was measured by a device as shown in FIG. 2. The distance between magnetic poles of the opposing N pole and S pole was 8 mm (surface flux density at a magnetic pole: 1,500 G, counter magnetic pole area: 10×30 mm). Non-magnetic plate electrodes (electrode area: 10×40 mm, electrode distance: 4 mm) were arranged in parallel between the magnetic poles. 200 mg of a sample was put between the electrodes and held therebetween by magnetic force. Alternating voltage was then applied using a withstand voltage tester (TOS5051, manufactured by Kikusui Denshi Kogyo). The applied voltage at the time when a leak electric current exceeded 110 mA was determined to be a dielectric breakdown voltage.

<Electric Resistance>

The measurement of an electric resistance was performed by holding a sample between the same electrodes as in the above measurement of dielectric breakdown voltage; applying a direct voltage of 100 V; and measuring electric resistance by an insulation resistance tester (TR-8601, manufactured by Takeda Riken).

[Production of a Coating Carrier]

A coating carrier was produced by coating a core material of the above Mg-based ferrite material with silicone resin. Spray-coating the Mg-based ferrite material with a silicone resin solution diluted with toluene; and then heating the material to 250° C. and keeping it at the temperature performed the coating treatment. The amount of the coating resin was 0.5 weight % based on the core material. The coating carrier was mixed with a commercially available toner for two-component developer such that the toner concentration should be 4 weight %. The obtained developer was used for image evaluation by a commercially available copying machine (Table 1). Evaluation items were adhesion of the carrier and development leak.

Comparative Examples 1 to 6

MgO, $Fe_2O_3$ and CaO were weighed and mixed at each of the compositions as described in Table 2, and an Mg-based ferrite material was produced in the same manner as in Examples 1 to 16. The values of saturation magnetization, dielectric breakdown voltage and electric resistance are shown in Table 2, and the relationship between the saturation magnetization and the dielectric breakdown voltage is shown in FIG. 1.

This Mg-based ferrite material was coated in the same manner as in Examples 1 to 16, and the image evaluation was performed (Table 2).

Comparative Examples 7 to 9

In Comparative Examples 7 to 9, an Mg-based ferrite material was produced in the same manner as in Example 1 to 16 except that the conditioning step in a nitrogen atmosphere having an oxygen concentration of 20-volume t was omitted. MgO, $Fe_2O_3$ and CaO were weighed at each of the compositions as described in Table 2.

The results of measurement of saturation magnetization, dielectric breakdown voltage and electric resistance are shown in Table 2, and the relationship between the saturation magnetization and the dielectric breakdown voltage is shown in FIG. 1. The average particle diameter after sintering was 50 μm. This sample was coated in the same manner as in Examples 1 to 16, and the image evaluation was performed (Table 2).

Comparative Examples 10 and 11

In Comparative Examples 10 and 11, An Mg-based ferrite material was produced in the same manner as in Examples 1-16 except that both the heating step at 1,200° C. in a nitrogen atmosphere and the heating step at 500° C. in a nitrogen atmosphere having an oxygen concentration of 20 volume % were omitted, and instead thereof, the heating step at 1,200° C. in air in an electric furnace was performed. MgO and $Fe_2O_3$ were weighed at each of the compositions as described in Table 2.

The results of measurement of saturation magnetization, dielectric breakdown voltage and electric resistance are shown in Table 2, and the relationship between the saturation magnetization and the dielectric breakdown voltage is shown in FIG. 1. The average particle diameter after sintering was 50

μm. This sample was coated in the same manner as in Examples 1 to 16, and the image evaluation was performed (Table 2).

By comparing Example 3 with Comparative Example 7, Example 5 with Comparative Example 8, Example 11 with Comparative Example 9, Example 3 with Comparative Example 10, and Example 5 with Comparative Example 11, respectively, the dielectric breakdown voltage is found to be improved by adopting the process of the present invention comprising two-stage heating steps.

Example 17 to 19

In Examples 17 to 19, an Mg-based ferrite material was produced in the same manner as in Examples 1 to 16 except that the maximum temperature of the heating step in a nitrogen atmosphere having an oxygen concentration of 20 volume % was changed to those as described in Table 3. MgO, $Fe_2O_3$ and CaO were weighed at each of the compositions as described in Table 3.

The results of measurement of saturation magnetization, dielectric breakdown voltage and electric resistance are shown in Table 3, and the relationship between the saturation magnetization and the dielectric breakdown voltage is shown in FIG. 1. The averaged particle diameter after sintering was 50 μm. This sample was coated in the same manner as in Examples 1 to 16, and the image evaluation was performed (Table 3).

TABLE 3

| Sample | Composition MgO:$Fe_2O_3$ (molar ratio) | Composition CaO (wt. %) | Temperature and atmosphere of step i) | Temperature and atmosphere of step ii) | Saturation magnetization/ emu/g | Dielectric breakdown voltage/kV | Electric resistance/Ω | Image evaluation | Remarks |
|---|---|---|---|---|---|---|---|---|---|
| Comparative example 1 | 35:65 | 4 | 1200° C., $N_2$ | — | 56.0 | 0.3 | $1.2 \times 10^7$ | development leak | omission of step ii) |
| Example 17 | 35:65 | 4 | 1200° C., $N_2$ | 400° C., 20 vol. % $O_2$ | 55.0 | 1.3 | $2.9 \times 10^8$ | good | |
| Example 18 | 35:65 | " | " | 450° C., 20 vol. % $O_2$ | 52.4 | 3.5 | $3.8 \times 10^9$ | " | |
| Example 11 | 35:65 | " | " | 500° C., 20 vol. % $O_2$ | 51.5 | 4.2 | $1.1 \times 10^9$ | " | |
| Example 19 | 35:65 | " | " | 800° C., 20 vol. % $O_2$ | 33.3 | 5.0 | $6.2 \times 10^9$ | " | |

As shown in the above results, the Mg-based ferrite carrier of the present invention has an advantage of achieving a good image quality without any development leak or carrier adhesion. Such an advantage may be attributed to the fact that both a proper saturation magnetization and a high dielectric breakdown voltage are realized. Although there has conventionally existed Mg-based ferrite having a high dielectric breakdown voltage, it has a problem of a low saturation magnetization. The Mg-based ferrite material of the present invention has a characteristic of an improved saturation magnetization while maintaining a high dielectric breakdown voltage.

POSSIBILITY OF INDUSTRIAL UTILIZATION

The Mg-based ferrite material and the Ca-containing Mg-based ferrite material of the present invention have an improved dielectric breakdown voltage in contrast to a conventional Mg—Fe—O based ferrite. Moreover, they exhibit a proper saturation magnetization value. The electrophotographic developer containing the Mg-based ferrite carrier of the present invention can meet recent environmental regulations, and can also realize a high image quality, thereby enlarging the scope of the design of a developer.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A Mg-based ferrite material consisting essentially of MgO and $Fe_2O_3$ components or of CaO, MgO and $Fe_2O_3$ components, and having a composition of formula (1)

$$Ca_aMg_bFe_cO_d \quad (1),$$

wherein a, b, and c satisfy $$0.10 \leqq b/(b+c/2) \leqq 0.85 \text{ and } 0 \leqq R(Ca) \leqq 0.10,$$

wherein R(Ca) is expressed as $$R(Ca) = a \times Fw(CaO)/(a \times Fw(CaO) + b \times Fw(MgO) + (c/2) \times Fw(Fe_2O_3))$$

(Fw(A): formula weight of A); and d is determined by oxidation numbers of Ca, Mg and Fe;

wherein said Mg-based ferrite material has a saturation magnetization measured at 14 kOe using an vibrating sample magnetometer, in the range of 30-80 emu/g, wherein said Mg-based ferrite material has a dielectric breakdown voltage in the range of 1.0-5.0 kV.

2. A Mg-based ferrite material as claimed in claim 1, wherein b and c satisfy 0.30 ≦b/(b+c/2) ≦0 .70.

3. A Mg-based ferrite material as claimed in claim 1, wherein said Mg-based ferrite material has an average particle diameter in the range of 0.01-150 μm.

4. An electrophotographic development carrier, which comprises a Mg-based ferrite material according to any of claims 1-3.

5. An electrophotographic development carrier, which comprises a Mg-based ferrite material according to any of claims 1-3, wherein said Mg-based ferrite material is coated with resin.

6. An electrophotographic developer, which comprises an electrophotographic development carrier according to claim 4, and a toner.

7. An electrophotographic developer as claimed in claim 6, wherein the ratio of the toner to the carrier by weight is in the range of 2-40 wt. %.

8. A process for producing a Mg-based ferrite carrier according to claim 1, which comprises:

i) mixing raw materials appropriately selected from the group consisting of MgO, $MgCO_3$, $Mg(OH)_2$ and $MgCl_2$ as Mg raw materials; FeO, $Fe_2O_3$, $Fe_3O_4$ and $Fe(OH)_x$ as Fe raw materials (x representing a number in the range from 2 to 3); and CaO, $CaCO_3$, $Ca(OH)_2$ and $CaCl_2$ as Ca raw materials, provided that at least one Mg-containing compound and at least one Fe-containing compound are selected;

ii) sintering the mixed raw materials to grow particles, wherein a maximum temperature is in the range of 800-1500 ° C.; and iii) heating the sintered raw materials under an oxygen-containing atmosphere to condition properties of the particles, wherein a maximum temperature in the range of 300-1000 ° C., wherein the oxygen concentration in the atmosphere in step (iii) is higher than that in step (ii).

9. A process for producing a Mg-based ferrite carrier as claimed in claim 8, wherein the atmosphere in step iii) is an inert gas atmosphere having an oxygen concentration of 0.05-25.0 vol. % on the basis of the total amount of the gases contained in the atmosphere.

10. A process for producing a Mg-based ferrite carrier as claimed in any one of claims 8 or 9, wherein the atmosphere in step ii) is an inert gas atmosphere having an oxygen concentration of 0.001-10.0 vol. % on the basis of the total amount of the gases contained in the atmosphere.

11. A process for producing a Mg-based ferrite carrier as claimed in claim 8, wherein step i) of mixing raw materials comprises steps of:

preparing a slurry containing a Mg-containing compound and a Fe-containing compound; and drying the slurry for granulation.

12. A process for producing a Mg-based ferrite carrier according to claim 11, wherein the slurry comprising a Mg-containing compound and a Fe-containing compound further comprises a Ca-containing compound.

13. A process for producing a Mg-based ferrite carrier according to claim 11 or 12, wherein the slurry comprising a Mg-containing compound and a Fe-containing compound further comprises a binder, wherein the content of the binder is in the range of 0.1-5% by weight, based on the total amount of the raw materials in the slurry.

14. A Mg-based ferrite material as claimed in claim 2, wherein said Mg-based ferrite material has an average particle diameter in the range of 0.01-150 μm.

15. An electrophotographic development carrier, which comprises a Mg-based ferrite material according to claim 14.

16. An electrophotographic development carrier, which comprises a Mg-based ferrite material according to claim 15, wherein said Mg-based ferrite material is coated with resin.

17. An electrophotographic developer, which comprises an electrophotographic development carrier according to claim 16, and a toner.

18. A process for producing a Mg-based ferrite carrier as claimed in claim 8, wherein the atmosphere in step iii) is an inert gas atmosphere having an oxygen concentration of 0.05-25.0 vol. % on the basis of the total amount of the gases contained in the atmosphere.

19. A process for producing a Mg-based ferrite carrier as claimed in claim 18, wherein the atmosphere in step( ii) is an inert gas atmosphere having an oxygen concentration of 0.001-10.0 vol. % on the basis of the total amount of the gases contained in the atmosphere.

20. A Mg-based ferrite material as claimed in claim 1, wherein "a" is from 0 to 0.21, "b" is from 0.10 to 0.70, "c" is from 0.60 to 1.6, and "d" is from 1.6 to 2.8.

21. An Mg-based ferrite material obtained by a process comprising:

i) mixing raw materials appropriately selected from MgO, $MgCO_3$, $Mg(OH)_2$ and $MgCl_2$ as Mg raw materials; FeO, $Fe_2O_3$, $Fe_3O_4$ and $Fe(OH)_x$ as Fe raw materials (xrepresenting a number in the range from 2 to 3); and CaO, $CaCO_3$, $Ca(OH)_2$ and $CaCl_2$ as Ca raw materials, provided that at least one Mg-containing compound and at least one Fe-containing compound are selected;

ii) sintering the mixed raw materials to grow particles, wherein a maximum temperature is in the range of 800-1500° C.; and iii) heating the sintered raw materials under an oxygen-containing atmosphere to condition properties of the particles, wherein a maximum temperature in the range of 300-1000 ° C.;

wherein an oxygen concentration of the atmosphere in step iii) is higher than that in step ii).

* * * * *

UNITED STATES PATENT AND TRADEMARK OFFICE

CERTIFICATE OF CORRECTION

PATENT NO. : 7,470,498 B2

APPLICATION NO. : 10/551691

DATED : December 30, 2008

INVENTOR(S) : Iinuma et al.

It is certified that error appears in the above-identified patent and that said Letters Patent is hereby corrected as shown below:

Title page item (30) Foreign Application Priority Data, in the second listed priority application, the date of "Nov. 4, 2003" should be changed to --Nov. 14, 2003--.

Signed and Sealed this

Twenty-second Day of December, 2009

David J. Kappos

*Director of the United States Patent and Trademark Office*